UNITED STATES PATENT OFFICE.

WILLIAM J. MELHUISH, OF UPPER PARKSTONE, ENGLAND.

MANUFACTURE OF VEGETABLE MILK AND ITS DERIVATIVES.

1,175,467. Specification of Letters Patent. Patented Mar. 14, 1916.

No Drawing. Application filed June 1, 1914. Serial No. 842,257.

*To all whom it may concern:*

Be it known that I, WILLIAM JAMES MELHUISH, a British subject, residing at Highwood House, Upper Parkstone, in the county of Dorset, England, lecturer in dietetics, have invented new and useful Improvements in the Manufacture of Vegetable Milk and Its Derivatives, of which the following is a specification.

This invention relates to improvements in artificial or vegetable milk, such improvements being based on the idea of making the said milk more closely resemble cows' milk in taste, in use and in keeping qualities.

For centuries the peoples of the East have made an emulsion of the soy bean, more or less milk-like in consistency, and containing a due proportion of albumin and fat. It is, and apparently always has been, a nauseous tasting beverage to the Western palate, but its food value is beyond all question. It has long been known as a milk producer in the human breast. Within the last few years experiments have been carried out with the idea of making soy milk more palatable, and a very careful study of the said soy milk hitherto made has been undertaken, and the details of improvement according to the present invention are found in the following paragraphs.

It is found that the "nutty" flavor hitherto associated with soy bean milk, is to a large extent due to the presence of a small quantity of soy bean oil which comes out in the casein extractive process. It may be explained here that the soy bean gives up this casein to the milk by grinding and then stirring the resulting meal in water at a suitable temperature. This objectionable flavor is got rid of by (1) either crushing the oil from the beans in making the meal and before using the meal for the casein extraction, or (2) crushing the whole bean into meal without rupturing the oil cells, and then, after the casein extraction is complete, separating the oil from it. For this purpose a cream separator or any well-known form of centrifugal separator or filter may be used, and the oil so separated can be utilized for other commercial purposes.

With regard to the question of sweetness, the first difficulty that presents itself is, that if one reduces the quantity of sugar the nutritive properties of the milk are also reduced, because the sugar is the only carbohydrate the milk contains and is responsible for the provision of energy in the body, or in the case of infants and those not requiring much energy, the production of fat. It is a well established physiological fact that human fat is not formed from fatty foods taken into the body.

In a careful analysis of the sugars of several samples of soy milk a proportion of dark malt extract has been found, exceeding in some cases 10 grams per liter. This malt has a high diastatic value and is extremely useful in the milk. This may be replaced to exactly the same extent by a dry crystallized or powdered form of maltose, white or almost white in color. This helps much to retain the true milk-like color in cooking, but there is still some darkening so that it may be discarded altogether and be replaced by either of the sugars enumerated in detail in the method which follows. A proportion of lactose or cows' milk sugar is also found in the soy milk to the extent of 2.2 grams per liter. This content may be undesirable, if it is intended to produce an entirely vegetable product. Again, cane sugar is present to the same extent as maltose, *i. e.* 10 grams per liter, and it is preferred to greatly reduce this, or to entirely exclude it. To make up for discarded sugars a pure dextrin is added so as to get a much less sweetening power while retaining to the full the carbo-hydrate value. Various examples in the method of working are described hereafter. Ordinary cows' milk contains a small portion of citric acid varying between 0.05 to 0.11 per cent., which combines with the lime associated with the casein and forms a citrate of calcium. It is considered probable that this citrate is one of the reasons why fresh milk is a complete food, whereas cooked, preserved and condensed milks seem to require the addition of fresh food to make their dietetic action antiscorbutic. To insure this, a suitable proportion of citric acid is added, such proportion varying between the figures quoted above and being preferably based on the quantity found in the particular cows' milk, which is taken as a standard for my improved milk to be made up. Further the addition of this citric acid greatly improves the flavor of the milk and destroys the slight nutty, beany or mealy taste which may remain in the finished product.

An examination of stale soy bean milk showed what appeared to be a butyric fermentation, the casein being affected in a curious way common to this form, and it is assumed that a small proportion of this acid was added to the necessary culture to develop the characteristic taste. While butyrin occurs naturally in cows' cream as one of the constituents of milk fat it is not advisable or necessary to add it with the culture in my improved milk, but it is preferred to add the said acid to the oils (with other acids essential to and forming part of cows' milk cream which may be lacking in the oil used to synthetically make the cream of my soy milk) while the culture of the desired lactic bacteria is added in a solution of pasteurized soy bean milk preserved from a previous batch. Butyric acid is volatile, but as it does not boil till it reaches over 160 degrees C., and the milk at no stage of its manufacture should reach even the water boiling point, the volatile stage of the acid is never attained and its power retained to the full. The amount should roughly correspond with the quantity found in the cows' milk which is used as the standard to work to.

As to the method of preparing and adding the culture this is dealt with hereafter. In some climates it is found necessary to pasteurize the milk by bringing it up, quickly, to a temperature of not less than 140° F., for say 20 minutes and then cooling as rapidly as possible. This greatly adds to the keeping properties and does not destroy the vitality of the milk or affect its taste, appearance or powers.

The following is a description as an example of the method of working more especially as regards the improvements covered by this application: For the provision of casein and albumin, soy beans ground into a fine meal are used, although any other seed which contains a high proportion of soluble albumins may be used, either mixed with the soy beans or otherwise. To produce 100 liters of finished milk, about 15 kilos of such soy meal are taken, but the proportion would vary if other seeds were used, depending, of course, upon their albuminous content. This meal is fed into 100 liters previously boiled water cooled down to a temperature not exceeding 90 degrees C., and the meal is so fed in that it is immediately taken up by the water and not allowed to float on the surface or coagulate in a mass. By a system of mechanical stirring the whole mass is kept moving, and this continues for a sufficient space of time to enable the meal to give up the whole of its soluble ingredients. The water is kept at about 90 degrees C.; it may vary a little above or below this, but it is preferred not to exceed this degree of heat, and, as the fluid becomes a milk-like color, the degree of heat is a little more difficult to read and requires careful watching. According to experience three quarters of an hour gives adequate results and the whole of the liquor is then drawn off and filtered by any suitable means. Preferably, a perpendicular box form of filter press is used, because only about one half of the total weight of the meal goes into solution, and the other half can then be extracted in a more or less dry cake, which is extremely valuable as a cattle food. The result of filtration is a beautiful milk-like liquor, which is then passed through a centrifugal separator with the idea of getting out the unpleasant tasting soy oil, which, if allowed to remain in, gives the milk a certain decided taste. The oil being extracted, and any form of cream or oil separator working efficiently will answer the purpose, the milk fluid is now ready for further treatment.

The first consideration is the oil, which is now to be added to form the cream in the artificial milk. A great many tasteless oils can be utilized for this purpose, but it is preferred to use sesame oil as a basis, and to add to this oil a proportion of butyric and other acids usually found in milk cream, which sesame oil does not naturally contain. This mixture of fats and acids is then to be so thoroughly incorporated with the liquid that a perfect emulsion results. This emulsion is obtained by any suitable emulsifying apparatus—and many such are familiar to dairy and chemical workers. It is preferred to use a vacuum pan, in which a vigorous boiling can be obtained at a very low degree of heat, and the violent ebullition makes emulsion quickly and perfectly. As an alternative, as for instance where water is difficult to obtain, there is the ordinary emulsifying pan, such as is used in making cod liver oil emulsion; or again, one of the roller processes, such as are used for treating ordinary cows' milk when it is required to be homogenized. The amount of fat which is added to make 100 liters of finished milk amounts to 3.600 kilos, which would give a certain fat content of over 3.5 per cent., but it is not necessary to adhere to this quantity and for special purposes one may add to or reduce the same. In order to improve on ordinary milk and to prevent the fraud of cream removal, it is preferred to make the emulsion so perfect and to divide the fat globules in so fine a degree that the cream will not rise by the law of gravity.

The carbo-hydrate ingredients will now need careful consideration. Although a proportion of milk sugar may be used, it is preferred not to do so, seeing that it is desired to make a purely vegetable product. Malt sugars are a useful addition, but tend to darken the milk in cooking, for instance, in the making of rice puddings, custards, and the like. Various carbo-hydrate ingredients can be used and several formulæ are given to make up a 5 per cent "sugar" content, per 100 liters as follows:—First, without maltose or milk sugar, 1875 grams of grape sugar or dextrose (the terms being synonymous), 2500 grams of dextrin, and with addition of 625 grams of pure cane sugar. Second, if a maltose is used, this may be either used in the form of the dark treacly extract or in the powdered crystallized form, and the proportion may run as follows:—1500 grams maltose, 1000 grams cane sugar and 2500 grams dextrin. Third, if milk sugar is used, for special purposes such as infantile feeding and for certain cheese making, then the proportion of carbohydrates would come out somewhat as follows:—1250 grams milk sugar: 1000 grams maltose; 250 grams cane sugar; 2500 grams dextrin. Any of these sugars may be replaced by honey for a demulcent drink. The proportions can be varied and interchanged to almost any extent desired as also the quantities prescribed. These carbo-hydrates may be added at any convenient stage of the manufacturing process, either in their normal state or previously dissolved in water.

Certain quantities of mineral salts are required to make the product into a perfect food, and valuable salts are extracted from the soy meal in getting out the casein. A proportion of potassium phosphate or other similar salts is added to the soy meal at the time of the extraction of the casein. Although varying quantities of this ingredient may be used, it is found the best results come by taking 20 grams of the salt to the 100 liters of the finished liquor.

To give one an alkaline reaction for as long as possible in the life of the milk, from 100 to 130 grams of bicarbonate of soda are used to the above named quantity of finished milk. But any other suitable alkali would answer the purpose, and the quanitity could be varied accordingly. Common salt (sodium chlorid) is added to the extent of from 50–70 grams per one hundred liters, and it is preferred to use this in the purest form in which it can be obtained. Citric acid is also an essential ingredient, and it is preferred to add this in the pure form to the amount of say 50 grams per 100 liters of finished milk. A culture of lactic bacteria must also be added to insure proper digestion of the milk, and, also, to make certain that the milk will end its life by separating into the familiar curds and whey, as in the case of dairy milk. Any suitable culture of lactic bacteria can be used. For instance, one might utilize the culture which is familiar to many dairy-maids as "a cream starter," and is generally supplied in the form of a white powder. A very small quantity of such starter would be sufficient to effectively curdle the example of 100 liters of milk and as this curdling is only required to take place after a length of time, say from 50 to 200 hours, and the immediate use of the culture is to give the milk a characteristic taste and aroma the quantity must be very greatly modified. To begin with one might use 100 milligrams of such dry "starter bacteria" and incorporate the whole of this quantity by thoroughly stirring the powder into the 100 liters of milk. A few minutes after this is done a given quantity—say, for example, two liters—should be taken from the batch, bottled up and set on one side, preferably to be kept in a thermostat box at a temperature of about 80 degrees F., until the next day. The remainder can be allowed to stand covered with a cloth for the culture to grow, and the length of time depends upon the weather and many other factors. The proper degree of growth can only be judged by experience, but when the flavor is right and the milk has a nice aroma, then it should be pasteurized by being heated in a steam pan up to not less than 140 degrees for a minimum period of 20 minutes. This will prevent the further development of the lactic culture, while leaving sufficient basis for the ripening of the milk in due time. The milk is then cooled down to 50–60 degrees F., as quickly as possible, passed through a filter cloth, and is then ready for bottling off. If it is desired to test by the burette the amount of lactic growth desirable, it is suggested that 100 c. c. of milk should neutralize between 4.5 and 7.5 c. c. of decinormal NaHO solution.

By the time one is ready to make another "brew" of milk the two liters set on one side should have formed up into a solid curd without gas bubbles and without a break. One liter is now added to 40 liters of sterile (pasteurized) milk and each liter of these 40 liters would be sufficient to treat 1600 liters of milk. At each "brew" sufficient starter should be left unpasteurized and put on one side for the culture of the next successive batch, which is prepared by adding as aforesaid 1 liter of the "solid" or "semi-solid" culture to 40 liters of the artificial milk, and it will be found that successive generations of the culture lead to a great improvement in the milk flavor. The culture can be strengthened from time to time by the addition of a small quantity of starter, but it is only necessary at long intervals. This method of development also saves much expense, since the addition of new or virgin bacteria to each batch would be a costly matter in the case of a daily output of thousands of liters.

By omitting or varying the ingredients one obtains different qualities of milk. For example, by omitting the fat and the acids connected therewith, a fatless or "skim" milk is obtained. By increasing the fat a rich cream-like substance is obtained, and for obtaining a thick synthetic cream stiff enough to be used as clotted cream is used, the milk can be charged with fat to almost any extent. In practical work a stiff milk containing over 70 per cent. of cream has been obtained, and such cream can be utilized for the making of margarin by churning, working and salting as in the manufacture of dairy butter, or such an increased fat ratio would be a valuable food for certain invalids, such as persons suffering from tubercular disease or other forms of body wasting.

By evaporating more or less of the water from the normal fluid milk a more or less condensed milk can be obtained to any degree, such as a thick cream paste or a granular mass, or a dry powder. By the removal of the sugars or by replacing same with a preparation of foodless sweeteners, such as saccharin or saxin, a milk suitable for diabetes is obtained; while by adding iron in its medicinal form, a milk of great value to anemic subjects is obtained. By such variations as will be obvious to the dairy trade, humanized milk, sterilized milk, or fermented milk can be produced. There is no difficulty in getting an excess of lactic bacteria and so making any form of soured milk desired. For various cheeses the casein may be curdled with lemon juice, or any other vegetable acid, or one may proceed in the orthodox way and use rennet. Discarding these additions and if time is of no importance, one may allow the natural ferments in the soy meal to effect the same result by allowing the unpasteurized milk to stand for a day or two until curdled, and then work up the curds so obtained in any way suitable for the class of cheese one wishes to produce. Dependence on the soy meal ferment is somewhat risky, results not being regular.

I claim:—

1. The process of making vegetable milk from soy beans crushed into a meal for the purpose of extracting the casein by stirring the said meal in hot water, filtering the solution from the residue, extracting the nauseous soy oil, adding to the above named filtering solution sesame oil and fatty acids to make an imitation cows' milk cream, emulsifying same so that the said fats will not rise by the law of gravity, adding dry crystallized powdered maltose with other sugars, and the necessary alkaline salts.

2. The process of making vegetable milk from soy beans by extracting the casein by means of hot water, adding oils and acids to this extract to form a cream and using dextrin and dextrose to obtain a carbohydrate value not too sweet and finishing the milk by adding the necessary salts and a lactic culture.

3. The process of making vegetable milk from soy beans crushed into a meal for the purpose of extracting the casein by stirring in hot water, filtering the resultant solution from its solid residue, treating this solution by extracting the nauseous soy oil, then adding the necessary oil and fatty acids to make an imitation cow-milk cream, adding the sugars and the necessary alkaline salts with the addition of citric acid to form a citrate of calcium with the lime salts associated with the casein, for the production of a sharp or clean flavor and to render the milk antiscorbutic, adding a lactic culture to enable the milk to sour in the form of curds and whey.

4. A process of making a new liquid food, milk like in taste, color and contents, using soy beans as a casein base, removing the nauseous soy oil, adding edible oils and fatty acids to imitate cows' milk, cream, sugars, salts, citric acid and a lactic culture combining the same into a liquid of the desired consistency, finally pasteurizing same for keeping.

Dated this 19th day of May 1914.

W. J. MELHUISH.

Witnesses:
W. P. BUNDEY,
W. E. HOARE.